Jan. 10, 1956     L. M. WERMELSKIRCHEN     2,730,697
CONTROL SYSTEMS

Filed March 25, 1953     3 Sheets-Sheet 1

INVENTOR.
LOUIS M. WERMELSKIRCHEN
BY
Raymond W. Junkins
ATTORNEY

Jan. 10, 1956   L. M. WERMELSKIRCHEN   2,730,697
CONTROL SYSTEMS
Filed March 25, 1953   3 Sheets-Sheet 2

INVENTOR.
LOUIS M. WERMELSKIRCHEN
BY
Raymond W. Jenkins
ATTORNEY

Jan. 10, 1956  L. M. WERMELSKIRCHEN  2,730,697
CONTROL SYSTEMS

Filed March 25, 1953  3 Sheets-Sheet 3

INVENTOR.
LOUIS M. WERMELSKIRCHEN
BY
Raymond W. Jenkins
ATTORNEY

United States Patent Office 2,730,697
Patented Jan. 10, 1956

2,730,697

CONTROL SYSTEMS

Louis M. Wermelskirchen, Cleveland, Ohio, assignor to Bailey Meter Company, a corporation of Delaware Application March 25, 1953, Serial No. 344,638

12 Claims. (Cl. 340—187)

This invention relates to systems for controlling the magnitudes of variables, such as temperature, pressure, rate of fluid flow, position or displacement, with the variables having any number of chemical, physical, electrical, thermal, or other characteristics. More particularly, the present invention relates to an improved protective circuit to be used in conjunction with the controlling systems.

The disclosed embodiment of the present invention is particularly well adapted for application to control systems utilizing the null method of measuring a condition to be controlled. In these control systems, the circuit for measuring or indicating the condition to be controlled is repeatedly rebalanced and the movement of the rebalancing mechanism is utilized to exhibit a measure of the condition as well as to exert control over it. Obviously, in these systems, the failure of certain elements of the measuring circuit results in a complete loss of control of the condition by the system. Upon the appearances of these malfunctions the condition may be allowed to assume, or be driven, to excessive or destructive magnitudes.

If a particular control system is being used to control the supply of heat to a furnace in response to variation of temperature within the furnace, as measured by a thermocouple subjected to the temperature inside the furnace, and adapted to control the state of balance of a null type of measuring circuit, failure by the opening, or short circuiting, of the thermocouple would not only render the measuring system unresponsive to changes in the temperature of the furnace, but would allow uncontrolled movement of the rebalancing element of the circuit to send the temperature of the furnace to destructive heights or destroy a process carried on within the furnace by allowing the temperature to drop below a desired minimum value. Thus, the furnace, or the product carried inside the furnace, may be destroyed by uncontrolled failure in the circuit of the control system.

To take a particular case, a short circuiting of a thermocouple would tend to establish in the including control circuit a response which would falsely indicate a sudden decrease in temperature within the furnace. The present invention provides a monitoring, or protective, relay system which is brought into effectiveness upon failure of the thermocouple by short circuiting to decrease the fuel supply to the furnace in order to prevent the furnace from reaching an excessive temperature.

It may be broadly stated that an object of the present invention is to provide a simple relay system which can readily determine the nature of the fault in a control system monitored and which gives a predetermined action by the control system upon the appearance of a fault.

Figure 1:
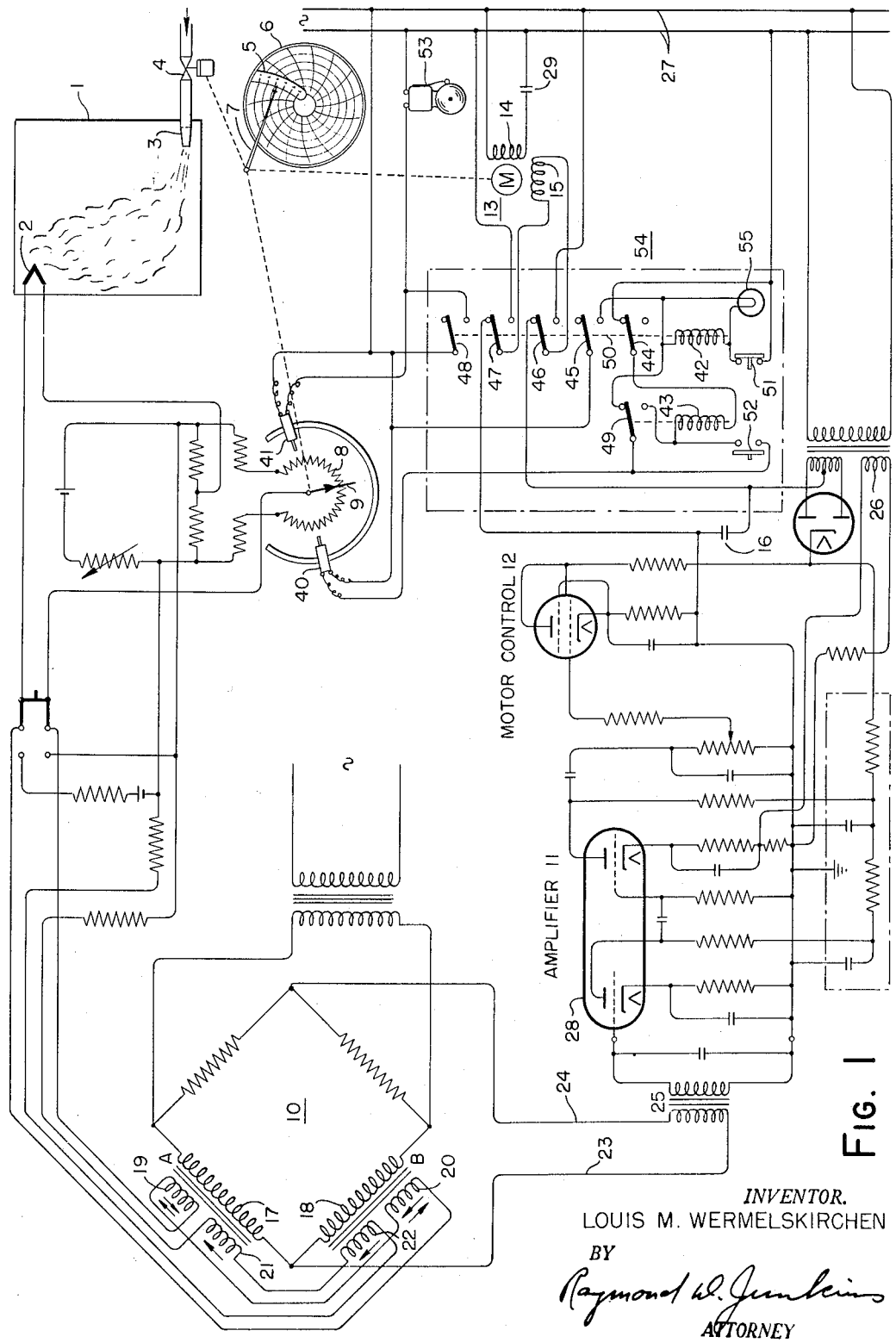
Fig. 1 is a diagrammatic representation of a control system utilizing an embodiment of the present invention in conjunction with a thermocouple primary element included in a control circuit.

Refer now to Fig. 1 where there is shown a complete wiring diagram for the measurement and control of temperature within a furnace 1 through the measurement of the D.-C. voltage generated by the thermocouple 2 which is arranged to be sensitive to the temperature within the furnace. The furnace is supplied by fuel through a burner 3 having a control valve 4. Desirably, the temperature of the furnace is indicated on a scale 5, recorded on a chart 6, and is controlled by the positioning of valve 4. The magnitude of the temperature within the furnace is indicated and recorded by a pen 7.

The thermocouple 2 is connected to a potentiometer circuit including a balancing slidewire 8. Adjacent to the slidewire 8 are switches 40 and 41 which are mechanically positioned in order that they may be actuated by a contactor 9 which is carried on the slider of the slidewire 8. It is contactor 9, moved with the slider of slidewire 8 that brings into operation a relay system, by actuation of switches 40 and 41, in a manner to be subsequently described.

The potentiometer circuit, including thermocouple 2 and slidewire 8, is a conventional balanceable network disclosed in at least Hornfeck 2,529,450. This circuit feeds a reactor converter 10 which in turn feeds an electronic tube amplifier 11 for control of a motor control tube 12. The motor 13, which is controlled, is illustrated as a capacitor-run A.-C. motor having stator windings 14 and 15 which are running coils electrically 90 degrees apart. Capacitor 16 is arranged to be in parallel resonance with the inductance of winding 15 such that motor rotation is controlled in direction dependent on the phase of the current supplied by the motor control tube 12. Thus motor 13 runs as a two-phase A.-C. motor and not only is reversed as to direction of rotation, but has speed control when rotating in either direction.

In the reactor converter 10, a Wheatstone bridge is formed with two of its legs comprised of A.-C. impedance windings 17 and 18, as two adjacent legs, and fixed resistances comprising the other two legs. These A.-C. winding legs are incorporated into saturable core reactors A and B which also have D.-C. control windings 19 and 20 and D.-C. bias windings 21 and 22. The D.-C. windings control the reactance of the A.-C. windings to, in turn, control the output of the reactor converter 10.

It is explained in at least Hornfeck 2,447,338 how the reactor converter utilizes the low level D.-C. output of a thermocouple to produce an A.-C. signal of phase and magnitude dependent on the polarity and magnitude of the D.-C. signal. The thermocouple output is taken into a network including slidewire 8 and it is actually the output current of this network which circulates in the D.-C. windings 21 and 22 to control the output of the reactor converter 10. Motor 13 actuates the contactor 9 over the slidewire 8 to balance the thermocouple network, and at the same time, indicate on 5, and record on 6, while controlling fuel valve 4.

The output of the reactor converter 10 appears as an A.-C. voltage between leads 23 and 24. This voltage is amplified by transformer 25 and further amplified by two-stage electronic amplifier 11 for the control of the motor control tube 12. This amplifier-motor control network is described and shown in at least Hornfeck 2,544,790.

Before going into greater detail of the specifically novel structure of the present invention it must be noted that on the transformer supplying the rectifier tube furnishing the necessary D.-C. operating voltages of the electronic amplifier there is a secondary winding 26 which places a fixed A.-C. potential in the grid-cathode circuit of the last stage of the amplifier tube 28. This fixed A.-C. potential is phased to drive the motor in a direction which will carry the pen to the top of its chart. If there is no potential between 23 and 24, or a potential of a very low order, the output of secondary 26 will become effective to position the motor. During the normal range of operating potentials between 23 and 24 this output is of no importance, being fixed, it can be compensated for in the calibration. However, it is always present as long as power line 27 is energized.

With the operation of the balanceable electrical network of Fig. 1 understood, generally, the situation may be considered wherein the thermocouple 2 is short circuited for some reason. As previously indicated, the two general types of failure to be considered in connection with thermocouples is either the short circuit, or the open. Should the thermocouple short circuit, the effect is to indicate a decrease in the potential output of the thermocouple. Normally, upon decrease in potential from thermocouple 2, the motor 13 attempts to rebalance the circuit by driving the contactor-slider 9 in a clockwise direction as viewed in Fig. 1. Therefore, without the present invention, motor 13 attempts to rebalance the circuit and opens fuel valve 4 to its limit in an attempt to increase the firing rate in furnace 1. Of course, as the temperature did not actually decrease, the added fuel through burner 3 creates an excessive temperature. The present invention prevents this undesirable result occurring upon a short circuit of thermocouple 2.

On a supporting ring, normally open switch 40 is placed in a predetermined position in the path of contactor 9. Clockwise movement of contactor 9 will, of course, close switch 40. Clockwise movement of contactor 9 is brought about when a short circuit of thermocouple 2 causes motor 13 to drive contactor-slider 9 in an attempt to rebalance its including circuit. Of course switch 40 would be contacted by 9 if the temperature in 1 were to actually decrease to a low value which would bring contactor 9 down to switch 40. Therefore, when furnace 1 is placed in operation, there will be a period, before it comes up to temperature, when switch 40 is closed by contactor 9.

For whatever reason switch 40 is closed, the condition is first considered where its closing will complete the circuit between line 27 and solenoid winding 42.

Solenoid winding 43 may also be placed across line 27 for a function to be considered subsequently. For the present, the simple situation is taken where switch 40 energizes coil 42, through switch 49, and moves switches 44–48 to their positions alternate to those shown in Fig. 1, through the agency of core 50 pulling downward on all of them simultaneously. Each of the switches will be considered separately in its function.

First, switch 44 is opened so that solenoid coil 43 cannot be energized while 42 is energized.

Switch 45, in its down position, completes the energizing circuit of coil 42 through itself. Subsequent opening of switch 40 therefore, will not cause de-energization of coil 42, because switch 45 has "locked-in" coil 42.

Switch 40 will be opened by contactor-slider 9 being promptly driven in a counter-clockwise direction by reason of switches 46 and 47, in their down position, connecting motor winding 15 directly across line 27. Due to the presence of capacitor 29, placed in series with winding 14 of motor 13, there is established a phase relationship between the A.-C. energizing motor windings 14 and 15 to drive motor 13 in the direction whereby it will move contactor 9 in a counterclockwisce direction, drive pen 7 to top of chart 6 and close fuel valve 4.

The moving of switch 48 to its down position throws alarm 53 across line 27 to give audible indication of this extreme position of motor 13.

Incidental notations may be made of the fact that when motor 13 drives contactor-slider 9 to its extreme position in a counterclockwise direction, switch 41, normally open, is closed. Switch 41, being in parallel with switch 48 in the circuit of alarm 53, the actuation of switch 41 in this particular phase of the operation is not important. Subsequent actuation of switch 41, in lieu of switch 48, will be subsequently considered. Also, it is to be noted that light 55 is in circuit with coil 42, and its energization will be visually indicated thereby.

As indicated previously, the ultimate position of contactor 9 at switch 41, from switch 40, may indicate either a low furnace temperature or an actual failure of the thermocouple 2 by short circuit. An operator observing the position of contactor 9 at switch 41 could examine the chart 6 to determine if a prior position of contactor 9 at switch 40 preceded its ultimate position at switch 41. Having determined this much of the action of the system, an operator would desire to test the system to determine whether a short circuit had actually occurred at thermocouple 2. Depressing switch 51, manually, breaks the circuit of coil 42 and core 50 returns switches 44–48 to their position shown. With switches 46 and 47 returned to the position shown in Fig. 1, motor 13 is momentarily brought under the control of motor control tube 12. If some transitory condition had caused contactor 9 to actuate switch 40, this de-energization of coil 42 will cause motor control tube 12 to rotate motor 13 so that it will position contactor-slider 9 over the normal range between switches 40 and 41. Then pen 7 will indicate on scale 5, and record on chart 6, the temperature existing within furnace 1, and control valve 4 will be positioned to maintain a firing rate of burner 3 which will maintain that condition of temperature within furnace 1. However, if a short circuit condition actually exists, or the temperature in furnace 1 is actually subnormal, the action as described heretofore will be repeated. Contactor 9 will be moved in a clockwise direction until it closes switch 40, motor 13 will then be thrown across line 27 to subsequently drive recording pen 7 to the extreme top of the chart and fuel valve 4 to its closed position.

Returning to the operation of the system as shown in Fig. 1, the alternate type of malfunction may be considered. Should thermocouple 2 be opened, an arrangement is provided, in the present invention, to move contactor-slider 9 immediately to the extreme position in its counterclockwise direction of rotation. The provision for this function begins with bias transformer winding 26. This secondary winding 26 supplied a constant voltage to the grid-cathode circuit of the second stage of the electronic amplifier tube 28. If the input to amplifier 11 is of a low order, or zero, the bias potential on the grid-cathode circuit of tube 28 is sufficiently high to rotate motor 13 positively so as to drive pen 7 to the top of the chart and actuate control valve 4 towards its closed position. Therefore, if thermocouple 2 were to open during the period of operation indicated in Fig. 1, contactor 9 would immediately be driven to its extreme counterclockwise position until switch 41 were actuated. This actuation of switch 41 would not be preceded by an actuation of switch 40 and coil 42 would not be energized. Actuation of switch 41, in parallel with switch 48, throws alarm 53 across line 27 to indicate a malfunction has occurred. Visual inspection by operating personnel will determine which type of malfunction has occurred.

Consideration must next be given to the function of the system upon bringing furnace 1 into initial operation. At the commencement of start-up of furnace 1, the recording pen 7, contactor 9 and valve 4 are in their minimum positions. Switch 40 is closed at this time and if suitable provision is not made, energization of line 27 will cause coil 42 to be energized, contactor 9 to be driven to its extreme counterclockwise position and alarm 53 energized. Therefore, if switch 52 is closed and switch 51 opened at the time of start-up, prior to line 27 being energized, coil 43 will be thrown across line 27 and its core will draw switch 49 into the position alternate to that shown. Switches 51 and 52 then may be restored to their positions shown and coil 43 will remain energized through switch 49 and switch 44. Now when furnace 1 has been brought up to a temperature which will cause the including network of thermocouple 2 to bring contactor 9 up into its normal range between switches 40 and 41, switch 40 will be opened and coil 43 will be automatically de-energized. As long as the temperature of furnace 1 remains within the normal operating range which will maintain contactor 9 between switches 40 and 41, the invention, including relay 54, will not be operative for positioning contactor-slider 9 in its extreme counterclockwise position.

Figure 2:
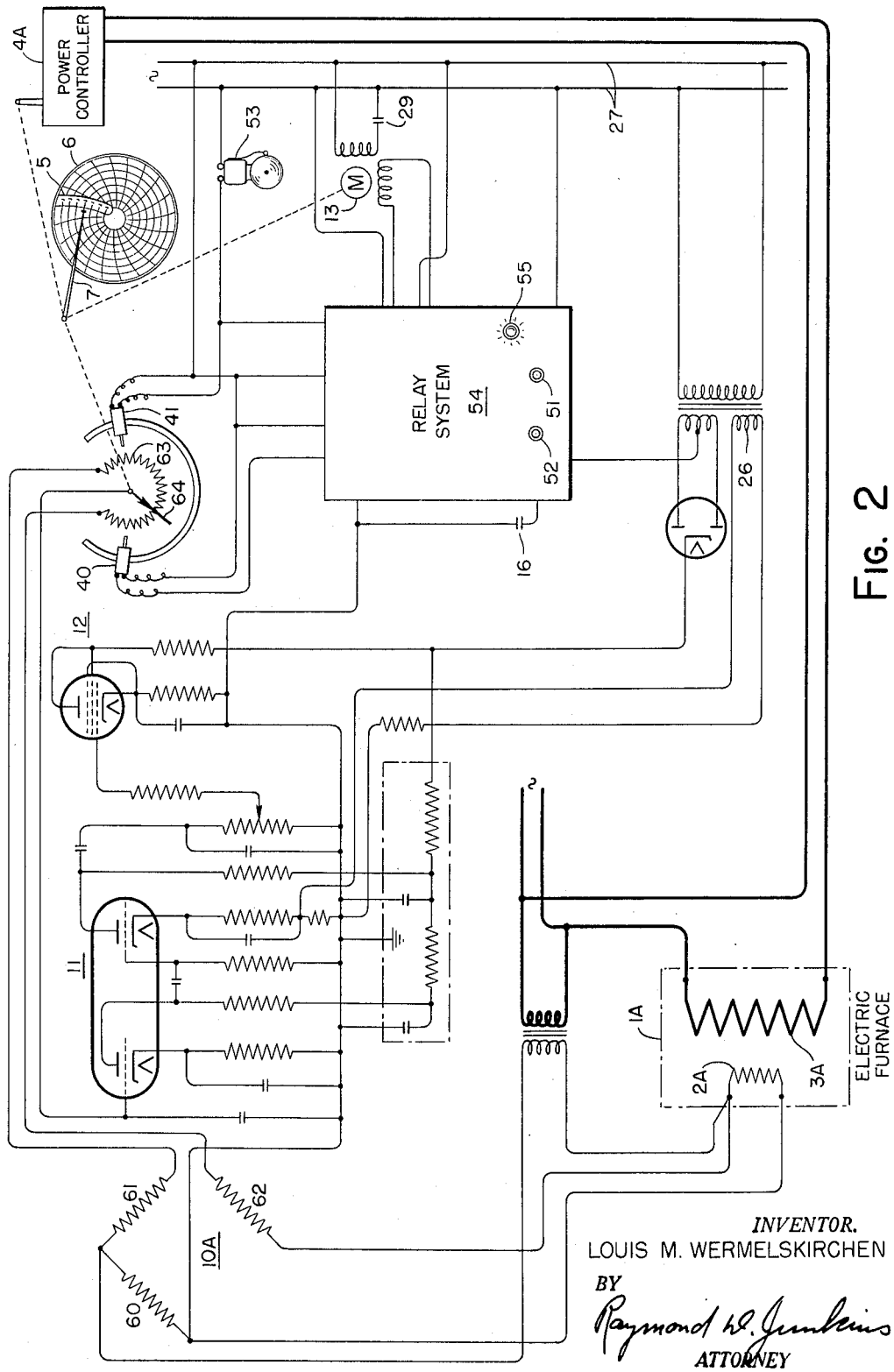
Fig. 2 is a diagrammatic representation of a control system, combined with the protective relay system, utilizing a temperature responsive resistance element.

Consider now the structure disclosed in Fig. 2. A second embodiment of the invention is applied to the control of temperature within an electric furnace 1A which, is heated by means of a power winding 3A. A measuring circuit, distinctively different from that shown in Fig. 1, is illustrated as including a resistance thermometer element 2A for sensing the temperature within furnace 1A. Resistance element 2A is specifically included as a single leg of Wheatstone bridge 10A. Additionally, bridge 10A includes three resistance legs 60, 61 and 62, with an adjustable resistance 63 in series and between fixed resistances 61 and 62. A movable contactor-slider 64 cooperates with a resistance 63 to maintain bridge 10A in balance. Resistance 63 is similar to slidewire 8 of Fig. 1 and contactor-slider 64 is similar in function and structure to contactor-slider 9 of Fig. 1.

Figure 3:
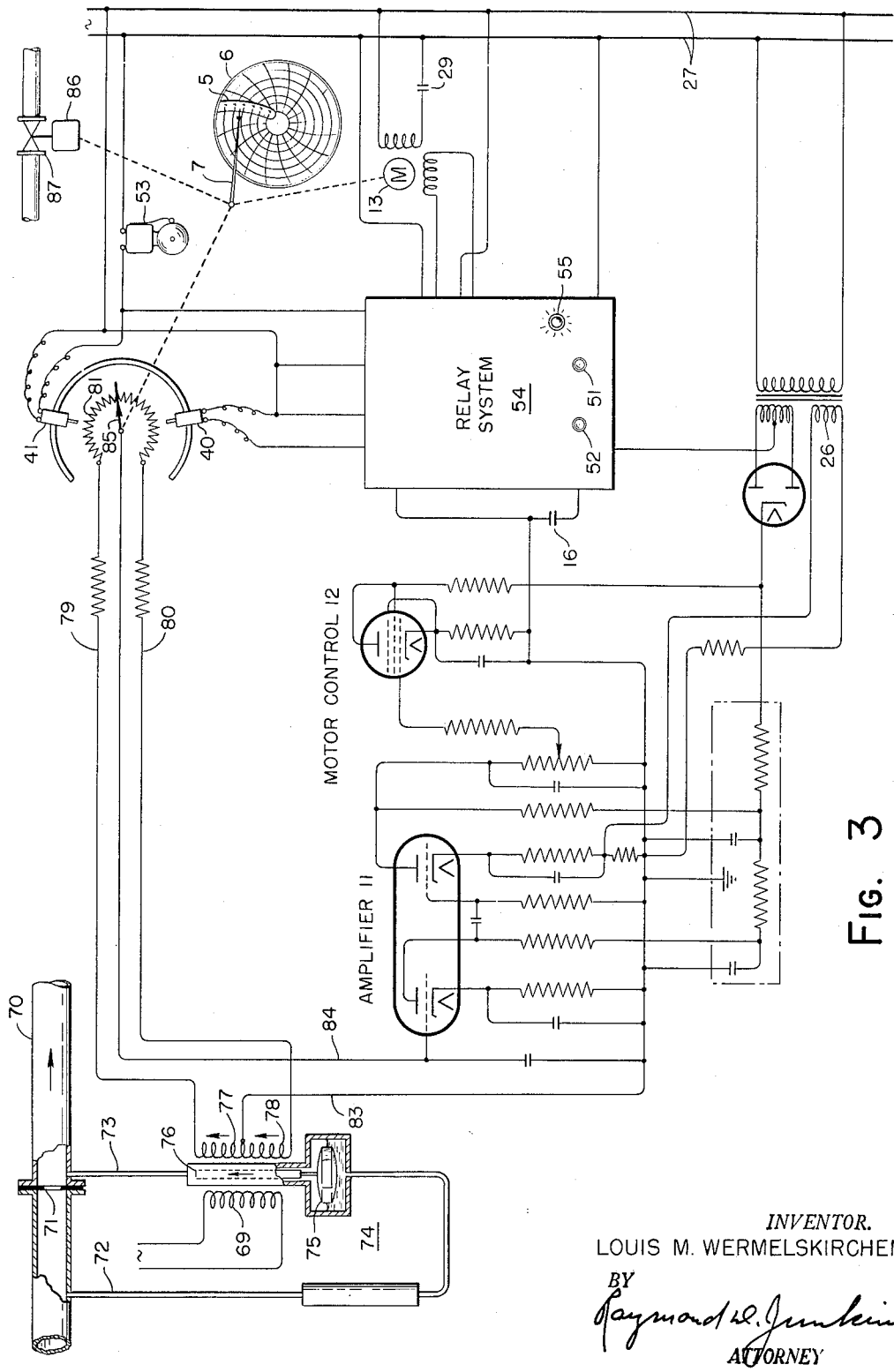
Fig. 3 is a diagrammatic representation of a flow control system combined with the protective relay device.

In Fig. 2, and subsequent Fig. 3, the indicating and/or recording pen 7, scale 5, chart 6, motor 13, electronic amplifier 11 and motor control tube 12 are shown performing their functions substantially as in the system of Fig. 1. The contactor-sliders are distinctively designated as well as the controlled valve for a supply to the condition to which the measuring network is sensitive. Otherwise, the relay system 54 occupies a position in each of the systems disclosed in the three figures of the drawing which is common to all of the disclosure.

Returning, specifically, to Fig. 2, it is evident that an unbalance of bridge 10A is brought about by a change in the value of resistance 2A. Upon an unbalance of bridge 10A, motor 13 positions contactor-slider 64 over resistance 63 until the bridge 10A is returned to balance. As motor 13 actuates contactor-slider 64, it simultaneously positions power controller 4A to adjust the amount of power dissipated in winding 3A.

It is now appropriate to consider the function of the system upon resistance element 2A being short circuited. With element 2A short circuited, bridge 10A will unbalance as though an extremely low temperature condition existed within furnace 1A. After a fashion similar to the function observed in connection with Fig. 1, motor 13 will drive contactor 64 in a clockwise direction in an attempt to rebalance the circuit. Switch 40 is closed by contactor 64 at a predetermined position in its travel in a clockwise direction and the relay system 54 will cause motor 13 to reverse its direction of rotation and promptly drive contactor-slider 64 in a counterclockwise direction. As in connection with Fig. 1, pen 7 will be driven to the top of chart 6 and the amount of power dissipated in winding 3A will be reduced to a minimum in order to protect furnace 1A.

Should resistance element 2A be broken, or opened, the bridge 10A will produce zero signal output into amplifier 11. Bias secondary winding 26 then becomes effective, with its constant potential in the grid-cathode circuit of amplifier 11, to cause a positive rotation of motor 13 which will result in driving recording pen 7 to the top of chart 6 and power controller 4A to its minimum position.

As in the embodiment disclosed in Fig. 1, alarm 53 will be sounded upon the appearance of either type of malfunction. A test may be made, by manually pressing switch 51, to indicate the type of malfunction. All other structural elements, such as light 55 and switch 52, function in the manner disclosed in connection with Fig. 1.

Refer now to the disclosure of Fig. 3 where the invention is embodied in a telemetric system for measuring and/or controlling the value of a variable such as the rate of flow of a fluid in conduit 70. In order to sense the rate of flow, a primary element, such as orifice 71, is positioned in conduit 70 and the opposite sides of this orifice are connected to pipes 72 and 73 in order that the differential may be imposed on a mercury filled U-tube 74. The float 75, of the U-tube, rides on the surface of the mercury to position a magnetic core 76 relative to secondary windings 77 and 78 of a movable core transformer having a primary winding 69.

A voltage-balance network is formed of secondary windings 77 and 78 in series with a resistance 81 over which is positioned a contactor-slider 85. It is desired to reduce the voltage between leads 83 and 84 to a minimum by moving contactor-slider 85 over resistance 81. Movement of core 76 will induce potentials in secondaries 77 and 78, resulting in a potential appearing across 83 and 84. Movement of contactor-slider 85 over resistance 81 will distribute the values of this resistance 81 between the two halves of the circuit until the potential between leads 83 and 84 is reduced to a minimum. Leads 79 and 80 necessarily complete the circuit between the secondaries and the distributed resistance.

If conductors 83 and 84 are termed the conjugate of this balanceable network, it may be said that a condition of unbalance caused by movement of core 76, will cause a voltage to appear in this conjugate which is of a phase and magnitude dependent upon the direction and amount of the movement of core 76. The voltage in the conjugate of the balanceable network is applied to the amplifier 11 and motor control tube 12 for directing the rotation of motor 13. The indicating and recording elements are identical with those of the preceding figures. Additionally motor 13 positions a controller 86 to move valve 87 in accordance with the condition in pipe 70. Control valve 87 may be considered to be in pipe 70 or in another pipe which controls a flow related to the measured flow of pipe 70. In any event, controller 86 has two extremes of position similar to those found in the preceding figures.

Now consider the various locations, and types, of malfunctions in this system of Fig. 3. Should a short circuit occur between lead 80 and lead 84, contactor 85 would be driven to switch 40 and the subsequent function of the invention would follow the preceding description.

If line 80 would become open circuited contactor 85 would be again driven to switch 40 and the resulting function of the invention would be as previously described. Should a short circuit occur across leads 83 and 84, a minimum signal would be imposed on amplifier 11. As in the preceding disclosure, transformer secondary 26, with its bias potential, would drive motor 13 until contactor 85 has moved to switch 41. A similar function would occur should line 79 fail by opening at any point along its length.

Finally, if line 84 were open circuited a minimum signal would appear at amplifier 11. The potential of transformer secondary 26 would again drive motor 13 so as to promptly actuate switch 41 without first actuating switch 40.

As in the preceding embodiments, alarm 53 is always sounded upon the appearance of any type of malfunction and switch 51 may be manually actuated to give further information about the type of failure. Therefore, regardless of the location, or type, of the failure in the control system, the element controlling the condition measured is always driven to its minimum, or fail-safe position. Further, this invention provides for rendering the alarm inoperative during the period of getting the measuring circuit into its normal range of operation from an initial condition of start-up. Further, the invention is placed into automatic operativeness as the contactor-slider of the measuring system is moved into its normal range of operation. The resulting combination of structure offers a unique system which renders many types of electrical control systems reliable, in that their malfunctions will always result in a fail-safe control movement and the analysis of the type of malfunction is readily ascertained.

What I claim as new and desire to secure by Letters Patent of the United States, is:

1. A combination of electrical measuring and controlling apparatus including, an electronic amplifier and motor control circuit having an input circuit and an output circuit, first terminal means adapted to connect the input circuit to a measuring circuit sensitive to a condition, second terminal means adapted to connect the output circuit to a motor driving an indicator and controller of the condition between two extremes of their position and range of control, a contactor member driven in consonance with the indicator and controller between the two extremes of position, balancing structure in the measuring circuit connected to the contactor member, a switch actuated by the contactor member when the indicator and contactor members are driven toward the extremes of their positions indicative of the minimum value of the condition which is when the controller is driven toward the maximum of its range of control, and a relay controlled by the actuated switch which actuates contacts disconnecting the second terminal means from the motor and connecting the motor in circuit with a power supply in an arrangement which causes the motor to drive the indicator to its maximum extreme of position and the controller to the minimum extreme of its range.

2. The combination of claim 1 including, a holding circuit controlled by the relay when the contactor member actuates the switch which actuates the relay causing the motor to reverse direction of rotation for continuing the disconnection of the motor and second terminal means throughout the travel of the indicator to its maximum extreme of position and the controller to the minimum extreme of its range.

3. The combination of claim 2 including, a first manually controlled circuit for breaking the holding circuit and returning the motor control to the output terminals of the electronic amplifier and motor control circuit.

4. The combination of claim 3 including, a second manually controlled circuit for preventing the actuated switch from controlling the relay when the actuated switch and contactor member have come into contact.

5. The combination of claim 4 including, an alarm circuit energised by the contactor member at predetermined positions between its two extremes of position.

6. The combination of claim 5 wherein, the measuring circuit is arranged so that malfunctions occur to cause it to send the motor toward either of its two extremes of travel.

7. The combination of claim 5 wherein, the measuring circuit is a thermocouple circuit and the amplifier motor control circuit is supplied a fixed bias signal which causes the motor to move the indicator to its maximum extreme of position and the controller to its minimum extreme of position upon the appearance of an open condition in the thermocouple circuit.

8. A combination including, a balanceable electric network sensitive to a condition with an internal arrangement providing for its balancing motor to be moved to either of its two extremes of travel upon occurrence of a malfunction in the network, a first set of contacts controlling the motor connections so that the motor will either respond to the network or move positively to a position indicative of the maximum value of the condition, a controller for the condition responsive to the motor and which decreases the condition as the indication of the condition magnitude increases, a first solenoid switch actuating the first set of contacts, a second set of contacts in the energizing circuit of the first solenoid switch, a second solenoid switch actuating the second set of contacts, and a minimum limit switch in the energizing circuit of the first solenoid switch actuated by a contactor on the balancing element of the network at a predetermined minimum value of the condition and which energizes the first solenoid switch through the normally closed second set of contacts.

9. The combination of claim 8 including a holding energizing circuit for the first solenoid switch controlled through the first set of contacts.

10. A combination of claim 9 including, a maximum limit switch actuated by the contactor on the network balancing element for control of an alarm circuit.

11. A combination of claim 9 including manually controlled means for breaking the circuit in which the first solenoid switch is included.

12. A combination of claim 11 including manually controlled means for energizing the second solenoid switch which positions the second set of contacts to break the circuit between the first solenoid switch and the minimum limit switch.

References Cited in the file of this patent

UNITED STATES PATENTS

| | | |
|---|---|---|
| 2,439,094 | Miles | Apr. 6, 1948 |
| 2,577,483 | Roosdorp | Dec. 4, 1951 |
| 2,633,558 | Wild | Mar. 31, 1953 |
| 2,648,040 | Schneider | Aug. 4, 1953 |